Reaction Time 90 min.
Manganese Sulfate 1 mol/l
Ammonia Excessive Ratio 100%

○ Atomizer Type A
× Atomizer Type B

Reaction Time 90 min.
Manganese Sulfate 1 mol/l
Reaction Temperature 30°C

United States Patent Office 3,798,310
Patented Mar. 19, 1974

3,798,310
METHOD OF REMOVING SULFUR OXIDE FROM GASES
Masumi Atsukawa, K1–1304 Mitsubishi Apartment House, 5, 1-chome, Kougominami-machi; Yoshihiko Nishimoto, 522–12 Danbarahinode-machi; and Kazuhiro Matsumoto, % Mr. Ono, 641–1, Kusatsuminami-machi, all of Hiroshima, Japan
Continuation-in-part of application Ser. No. 864,961, Oct. 6, 1969, which is a continuation of application Ser. No. 548,340, Mar. 4, 1966, both now abandoned. This application Dec. 8, 1970, Ser. No. 96,162
Claims priority, application Japan, Mar. 24, 1965, 40/17,091
Int. Cl. B01d 53/16, 53/34
U.S. Cl. 423—244                    14 Claims

ABSTRACT OF THE DISCLOSURE

A process of employing an economically-attractive sulfur oxide absorbent, the absorbent being an activated hydrated-manganese oxide characterized by electron microscope-determined microscopic particles of one or more of string or plate or foil shape(s), by 4.6 or 7.18 angstroms distance between atomic planes at maximum defraction strength of line, by a formula $$MnO_{1.5-1.8} \cdot (0.1-1.0)H_2O$$

and by a sulfur oxide-absorption capacity ranging from about 0.2 (i.e., 20%) greater to about 10 times greater absorption capacity as compared to typically: ammonium persulfate/manganese sulfate-derived and electrolytically-derived 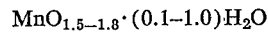$MnO_{1.88}$, and sodium carbonate/manganese sulfate-derived $Mn_2O_3$. A preferred cyclic process employing pressurized air or oxygen bubbles of small size to thereby rapidly oxidize an aqueous mixture of manganese sulfate and an excess of ammonium hydroxide results in an industrially-attractive process which heretofore has been industrially unacceptably inefficient and high-cost when employing other types of manganese oxide.

---

This is a continuation-in-part of our copending application Ser. No. 864,961, filed Oct. 6, 1969, and now abandoned, which in turn was a continuation of application Ser. No. 548,340, filed on Mar. 4, 1966, and now abandoned.

SUMMARY OF THE INVENTION

This invention generally relates to the removal of sulfur dioxide contaminants and/or sulfur trioxide contaminants, hereafter collectively referred to as sulfur oxides, from effluent waste and/or off-gases from various industrial processes or systems. As contrasted to prior belief that manganese oxide absorbant for commercially feasible processes was unacceptable because of its unacceptably low capacity for sulfur oxide(s) absorption in conjunction with its high cost of production, the invention overcomes these objections.

Considered from another aspect, the invention is concerned with a gas purification process for the removal of sulfur oxides from waste gases, in which ammonium sulfate is obtained as the end product.

The inventive gas purification process for the removal of sulfur oxides from a gas flow is a dry process, wherein the gas flow or stream from which the sulfur oxides are to be removed, is contacted with activated hydrated manganese oxide in powder form.

With a view of reducing air pollution, sulfur oxide containing waste gases are generally subjected to a sulfur oxide removal treatment before being released to the atmosphere. For this purpose, numerous processes have been developed by means of which the sulfur oxides are eliminated from the waste gas in a more or less quantitative and economic manner. The most common sulfur oxide removal processes are wet processes, wherein the waste gas flow is washed with an aqueous solution, to remove the sulfur oxides from the gas. These prior art wet processes are not suitable for removing sulfur oxides from large volumes of waste gases as they are generated in large-sized plants. This is primarily due to the fact that, after the waste gas flow has been wet-treated by passing it through an aqueous solution, the temperature of the gas flow is reduced and the moisture content in the gas is increased to such an extent that the gas, upon subsequent release to the atmosphere, does no longer properly diffuse. For this reason, dry gas purification processes have been suggested, wherein the sulfur oxides are removed by a solid-gas contact between the gas flow and a solid absorbent or adsorbent.

Various reactants have been suggested for the removal of sulfur oxides from a gas flow in a dry process. Active carbon, silica gel and specific ion-exchange resins have thus been proposed for this purpose. In these processes, the reactant acts in the manner of adsorbent. A dry absorption process in which an alkalized alumina or metallic oxide is used has also been suggested.

However, experience has demonstrated that these prior art absorption processes are difficult to carry out successfully, primarily due to the rather poor adsorption ability of the adsorbents for dilute $SO_2$ at temperatures above 100° C. Further, the adsorbents proper are expensive and it is connected with considerable difficulties and expenditure to regenerate the spent adsorbents. For this reason, the prior art dry adsorption processes of the indicated kind have not proved to be satisfactory and have therefore not found proper recognition in the industry.

Although the dry absorption process previously referred to, in which alkalized alumina or metal oxides are used, is suitable for the removal of sulfur oxides from a gas flow at temperatures above 100 degrees centigrade, iron oxide, magnesium oxide, and calcium oxide, which are customarily used in this dry process, are effective to absorb sulfur oxides at temperatures below 300 degrees centigrade.

According to a more recent proposal, alkalized alumina and manganese oxide are used as absorbents in dry processes for eliminating sulfur oxides from gases at temperatures between 100 and 300 degrees centigrade. However, the use of alkalized alumina for the indicated purpose is disadvantageous, because the spent alumina can only be regenerated by a reducing gas at 500 to 600 degrees centigrade, which renders the process prohibitively expensive.

Concerning manganese oxide as an absorbent, it is known that manganese oxides prepared under the following specific conditions have an absorption capacity for sulfur dioxide and sulfur trioxide, but considerably less absorption capacity than the manganese oxide hydrate of this invention, the prior art manganese oxides having jointly such low efficiency and high cost of manufacture and/or regeneration of the manganese oxide as to make prior processes economically unattractive. Thus, opposite to a low efficiency in sulfur oxide absorption capacity taught by prior art, and opposite to the expected prior art high cost processes, the novel process of this invention is unexpectedly a low cost process newly using the absorbent of this invention characterized by an unexpectedly high absorption capacity for sulfur oxides as well as different physical properties from the prior used manganese oxides. Typical prior art processes are as follows:

(1) Manganese oxide ($MnO_{1.88}$ having about 2.392 angstroms distance between atomic planes at maximum defraction strength of line, and being a gamma-manganese oxide) obtained by adding ammonium persulfate to manganese sulfate, to form a precipitate, which upon filtering and rinsing with water is dried at 130 degrees centigrade.

(2) Manganese oxide (gamma-$Mn_2O_3$ having a low sulfur-oxide-absorption capacity, and the mono-hydrated form (gamma-$Mn_2O_3 \cdot H_2O$) having a microscopic-particles shape of "needle-shaped" configuration; the gamma-$Mn_2O_3$ absorbs merely about 24 percent (out of 100 percent sulfur oxide) which is low relative to the present invention) obtained by adding sodium hydroxide to manganese sulfate to form a precipitate. The precipitate, upon filtering and rinsing, is dried whereupon it is heated in an air stream to about 300 degrees centigrade. The product is then heat treated under reduced pressure at a temperature between 300–400 degrees centigrade. The ratio of oxygen atoms to manganese atoms range from about 1.47 to about 1.48.

(3) Electrolytic manganese oxide (i.e., gamma-$MnO_{1.88}$ characterized by very minor (low)—almost no—sulfur oxide absorption capacity, such as about 10 percent) obtained by electrolyzing a manganese sulfate solution to form a deposit on an anode. This deposit, upon washing and drying, is heat treated under reduced pressure at a temperature of between 300–400 degrees centigrade; and (4) Manganese oxide (i.e., gamma-$Mn_2O_3$, also having a very low sulfur oxide removal capacity, and when hydrated—i.e., when $Mn_2O_3 \cdot H_2O$—having microscopic needle-shaped particles) obtained from deposit formed at the cathode according to the procedure above. The deposit is first washed and dried and is then heated to 300 degrees centigrade, whereafter it is heat-treated at the same temperature under reduced pressure.

However, the manganese oxides hereinabove discussed are prohibitively expensive to produce, particularly in large quantities as required when large volumes of waste gases are to be treated, as well as having low absorption capacity for sulfur-oxide gas(es). This high cost exists, for example, because expensive chemicals are necessary to arrive at the required magnesium oxides and, as will have been noted from the above, electrolytic procedures and vacuum conditions as well as high temperature treatments with hot gases are necessary.

Accordingly, it is a primary object of this invention to overcome the drawbacks of the prior art processes and to provide for a dry process for the removal of sulfur oxides from a flow of waste gas, wherein the absorbent or reactant is an activated hydrated manganese oxide which has superior absorption activity in respect to the sulfur oxides, which can be easily regenerated and thus recycled to the process and which can be produced and regenerated in an inexpensive and simple manner.

Another object of the invention is to provide a cyclic or continuous process for the removal of sulfur oxides from sulfur oxide-containing waste gases, wherein the absorbent or reactant is an inexpensively produced activated hydrated manganese oxide and wherein ammonium sulfate is obtained as the final product.

A still further object of the invention is a process of removing sulfur oxides from sulfur oxide-containing waste gases by means of active, hydrated manganese oxide which reacts with the sulfur oxides in the waste gas to form manganese sulfate which, thereafter, by means of ammonia and oxygen or an oxygen-containing gas, is converted into ammonium sulfate and active hydrated manganese oxide, which latter is recycled for reaction with a fresh amount of waste gas flow.

Generally, it is an object of this invention to improve on the art of sulfur oxide removal from waste gas flows as presently practiced.

Another object of the invention is to provide a simple dry process for treating sulfur oxide-containing gas with an absorbent by means of which the sulfur components in the gas are effectively and substantially quantitatively removed so as ultimately to form ammonium sulfate of high purity which may be recovered in commercial quantities, while the absorbent used for removing the sulfur oxide from the gas flow is regenerated and recycled to the process.

The various features of novelty which characterize the invention are pointed out with particularity in the claims annexed to and forming a part of this specification. For a better understanding of the invention, its operating advantages and specific objects attained by its use, reference should be had to the accompanying drawings in which there is illustrated and described a preferred embodiment of the invention.

Figure 1:
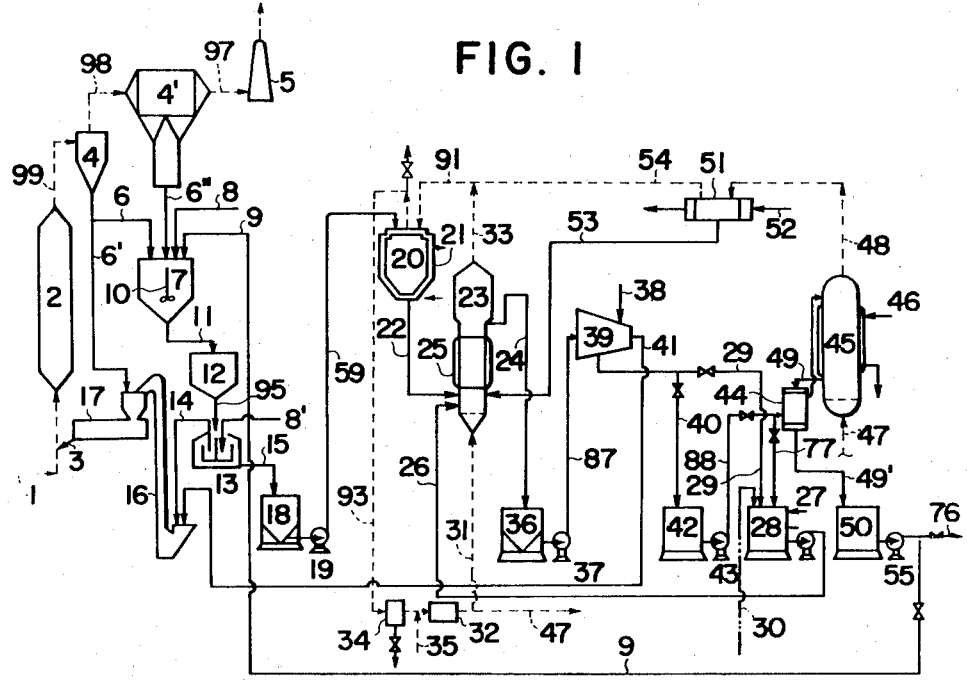
FIG. 1 is a diagrammatic representation of one embodiment of a plant for carrying out the inventive gas purification process in a continuous manner.

Referring now to the drawings, FIG. 1 indicates diagrammatically a plant for removing sulfur oxides from a waste gas flow by means of activated hydrated manganese oxide characterized by microscopic particles of at least one of string shape, plate shape, and foil shape, by a formula: $MnO_{1+i} \cdot XH_2O$ wherein $i$ ranges from about 0.5 to about 0.8 and X ranges from about 0.1 to about 1.0, and by 4.6 or 7.18 angstroms distance between atomic planes at maximum defraction strength of line, preferably derived by reaction at a predetermined cooled temperature between aqueous manganese sulfate solution, ammonium hydroxide, and oxygen, and more preferably derived by a reaction consisting of rapid oxidation by bubbling pressurized oxygen-containing gas bubbles through a mixture of the ammonium hydroxide present in at least about a stoichiometric amount and the aqueous manganese sulfate solution, the bubbles ranging substantially each respectively from about 0.2 to about 5.0 millimeters in diameter, with the predetermined temperature ranging from about 10 to about 45 degrees centigrade, and with the contacting comprising dispersing said particles in a flow of the sulfur oxide-containing gas, the activated hydrated manganese oxide as characterized having from about 0.2 greater (i.e., 20% greater) to about 10 times greater absorption capacity for sulfur oxide than the manganese oxides employed in the heretofore inefficient and costly prior art processes; the manganese oxide and the sulfur oxides form manganese sulfate which is thereafter converted back into activated manganese oxide and ammonium sulfate.

A flow of $SO_2$ and $SO_3$ containing gas, which emanates from a plant producing such gas, is conveyed through conduit 1 into a solid gas contacting apparatus or column 2. The solid gas contacting apparatus 2 contains an absorbent in the form of hydrated manganese oxide of a specific formulation to be explained below, whereby the $SO_2$ and $SO_3$ are absorbed by or react with the hydrated manganese oxide to form manganese sulfate. The absorbent, to wit, the hydrated manganese oxide, is supplied to the contact apparatus 2 from a supply container 17 which feeds the absorbent in powder form into the waste gas flow below the contact apparatus 2, as indicated by the arrow 3. The absorbent material could, of course, be fed directly into the contact column 2. The waste gas exits through an outlet provided at the top of the column 2 and flows through line 99 into a separator or dust collector 4 and from there through line 98 into separator or dust collector 4'. The waste gas then passes through conduit 97 into the chimney 5 from where the purified waste gas is discharged to the atmosphere.

The waste gas flow exiting through line 99 from the contact apparatus 2 carries along the manganese sulfate which has been formed in the column and also unreacted manganese oxide, to wit, the absorbent. The manganese sulfate and the unreacted absorbent are deposited in the dust collectors 4 and 4', then a portion of the deposit collected in the collector 4 and all of the deposit in the collector 4' are conveyed from the respective dust collectors through lines 6 and 6'', respectively into a leaching container 7. A residual amount of the deposit in the collector 4 is fed back to the supply container 17 through line 6'. The leaching container is provided with an agitator 10 as indicated in the drawings. Water is supplied to the leaching container 7 through line 8. Instead of water, an ammonium sulfate solution may be introduced into the leaching container 7 through line 9 which latter connects to a collecting tank 50 to be described hereinbelow. The amount of water or aqueous ammonium sulfate solution supplied to the leaching container 7 should be sufficient so as to dissolve the manganese sulfate which has been supplied through lines 6 and 6'' while, of course, the manganese oxide, to wit, unreacted absorbent will remain in solid form. The dissolution of the manganese sulfate is facilitated by the provision of the agitator or mixer 10. The leaching of the material in the leaching container 7 thus results in the formation of a suspension, the liquid phase of which consists of dissolved manganese sulfate, which may be enriched by ammonium sulfate in the event that ammonium sulfate solution has been supplied through line 9, while the solid phase is unreacted oxide. This suspension is withdrawn from the bottom of the leaching container 7 through line 11 and is fed into a storage vessel 12. The contents stored in the vessel 12 may at any suitable time be conveyed through line 95 into a solid-liquid separator 13. The solid material in the suspension, to wit, the unreacted manganese oxide, is conveyed from the separator 13 through conduit 14 onto a conveyor diagrammatically indicated by reference numeral 16 and from there into the supply receptacle 17 previously discussed. The unreacted absorbent, prior to being fed into the supply container 17, is washed with water supplied to the separator 13 through line 8'. From the container 17, in which the hydrated active manganese oxide is stored in powder form, the latter is recycled to the process as indicated by the arrow 3.

The aqueous manganese sulfate solution, which may be enriched by ammonium sulfate solution as set forth hereinabove, is discharged from the separator 13 through line 15 and is stored in a collecting vessel 18. This solution is then fed from the vessel 18 through line 59 into a tank 20. A pump 19 is connected in the line 59 to facilitate the transportation of the solution from vessel 18 into tank 20. Tank 20 is, in fact, an ammonia recovering tank, as will become apparent from the following description and is equipped with a cooling jacket 21 through which cooling water circulates. In this manner, the temperature within the tank 20 can be maintained below a predetermined maximum temperature. Both ammonia and oxygen are supplied to the tank 20 through line 91 as will appear more fully from the subsequent description. The manganese sulfate solution supplied to tank 20 through line 59 is partly converted in the tank into the mixture of manganese hydroxide and lower manganese oxides, while the sulfate moiety is converted into ammonium sulfate. The mixture formed in the tank 20 is conveyed through line 22 into an oxidation column, generally indicated by reference numeral 23 wherein the manganese hydroxide is further oxidized into activated hydrated manganese oxide. The oxidation column 23 is supplied with ammonia which emanates from a tank 28 which latter is supplied with gaseous ammonia through line 30 and with an aqueous solution which, in fact, is a wash solution obtained from washing the activated hydrated manganese oxide in the solid-liquid separator 39 to be discussed hereinbelow. The wash solution flows to the tank 28 through line 29, while the ammonium hydroxide ($NH_3OH$) formed in the tank 28 is conveyed from the tank through line 26 into the oxidation column 23. The oxidation column 23 has a cooling jacket 25. The tank 28 is equipped with a cooling pipe diagrammatically indicated by reference numeral 27 to reduce the temperature in the tank during the reaction of the gaseous ammonia supplied through line 30 with the aqueous wash solution entering the tank through line 29.

The oxidizing agent, such as air, but preferably oxygen gas, is supplied to the oxidation column 23 through line 31 from compressor 32 in the form of fine bubbles which are formed by passing the oxygen through a gas dispersion device. Unreacted oxygen exits through the top of column 23 through line 33. This unreacted oxygen contains ammonia. After the ammonia has been removed from this gas mixture, which is accomplished by passing the mixture from line 33 through line 91 into the ammonia recovery tank 20, the pure oxygen is discharged from tank 20 through line 93 into a mist separator 34 and from there back into the compressor 32. Supplemental oxygen may be supplied through line 35.

The oxidation product obtained in the column 23 is withdrawn from the column through line 24 and stored in cell 36. This oxidation product is thus a suspension or dispersion essentially consisting of ammonium sulfate solution and solid hydrated manganese oxide. This material is then fed from cell 36 into the solid-liquid separator 39 through line 87, the feeding of the suspension from cell 36 to the separator 39 being facilitated by the interposition of the pump 37. Water is supplied to the separator 39 through line 38 to wash the cake of manganese oxide and the suspension is thus separated in the separator 39 into an ammonium sulfate solution, a wash liquid 29 and activated or active hydrated, to wit, water-containing manganese oxide. The activated water-containing manganese oxide is fed through line 41 back onto the conveyor 16 and from there into the storage or supply container 17 which already contains the hydrated manganese oxide which has been fed into the container through line 14 from the separator 13.

The wash liquid is fed through line 29 into the tank 28 where, as previously mentioned, this liquid absorbs gaseous ammonia supplied through line 30.

The ammonium sulfate solution, in turn, is discharged through line 40 into a cell 42. Since the ammonium sulfate solution contains ammonia, the liquid from cell 42 is conveyed through line 88 and through a heat exchanger 44 into a column 45. A pump 43 is interposed between the cell 42 and the heat exchanger 44 in order to facilitate the feeding. A portion of ammonium sulfate solution may be fed through line 77 into the ammonium hydroxide producing tank 28. Steam is introduced into the column 45 through steam line 46, while oxygen emanating from the compressor 32 is blown into the column through line 47. Due to the heat treatment to which the solution is subjected in the column 45 and the introduction of oxygen ammonia is released. The released ammonia exits through line 48 and is cooled in a condenser 51 by means of cooling water which is introduced through line 52. In this manner, ammonium hydroxide ($NH_4OH$) is formed which is discharged from the condenser 51 through line 53 and enters the oxidizing column 23 as previously explained. Oxygen gas which exits from the column 45 through line 48, in conjunction with the released ammonia, in turn, is discharged from the condenser 51 through line 54. This oxygen which thus contains some amounts of ammonia flows through line 54 into line 91 from whence it enters the ammonia recovery tank 20. As previously set forth, oxygen emanating from column 23 through line 33 also enters the tank 20 through line 91. After the ammonia has been removed from the oxygen which enters through line 54, the latter is recycled to the compressor 32 through line 93.

The ammonium sulfate solution remaining within the column 45 is discharged through line 49 and at this stage is thus devoid of free ammonia. The discharged solution is cooled by heat exchange in the heat exchanger 44 which is accomplished with the incoming solution pumped by pump 43 from the cell 42 through line 88 into the heat exchanger 44. The ammonium sulfate solution then flows through line 49' into the ammonium sulfate storage tank 50. In the event that ammonium sulfate is supplied to the leaching container 7, ammonium sulfate may be withdrawn from the storage vessel 50 through line 9 to be fed into the vessel 7, as previously explained. For this purpose, a pump 55 may be provided to facilitate the feeding. Excess amount of ammonium sulfate may be discharged from the tank 50 through line 76.

The following reactions take place in the inventive process:

$$MnO_{1+i}XH_2O + SO_2 + \tfrac{1}{2}(1-i)O_2 = MnSO_4 + XH_2O \quad (1)$$
$$MnO_{1+i}XH_2O + SO_3 = MnSO_4 + XH_2O + \tfrac{1}{2}iO_2 \quad (2)$$

Regenerating reaction $$MnSO_4 + 2NH_4OH = Mn(OH)_2 + (NH_4)_2SO_4 \quad (3)$$
$$Mn(OH)_2 + i/2 O_2 + (X-1)H_2O = MnO_{1+i}XH_2O \quad (4)$$

The inventive process has many advantages which may be briefly summarized as follows:

(1) The absorbing capacity of the inventive hydrated manganese oxide in respect to $SO_2$ and $SO_3$ is superior to that of manganese oxides produced according to conventional prior art processes. The manganese oxide of this invention can be readily and quickly regenerated in a relatively inexpensive and simple manner and the regenerated material may then be recycled to the process. For the purpose of regeneration, oxygen or an oxygen-containing gas as seen in Formula 4 may be used. By selecting suitable reacting conditions, excellent results are obtained without requiring expensive chemicals as oxidizing agents.

(2) Ammonium sulfate of high purity is produced as a by-product which is of economic importance.

(3) Upon adding ammonium hydroxide to the manganese sulfate which has been formed as a result of the reaction of the manganese oxide with the sulfur oxides, manganese hydroxide is formed as shown in the above Formula 3. Upon oxidizing the manganese hydroxide into activated hydrated manganese oxide according to Formula 4, the reactivity of the hydrated manganese oxide in respect to $SO_2$ and $SO_3$ may be varied in accordance with the kind and nature of the oxidizing agent used, the alkali concentration, the reaction temperature and the reaction period.

Figure 2:
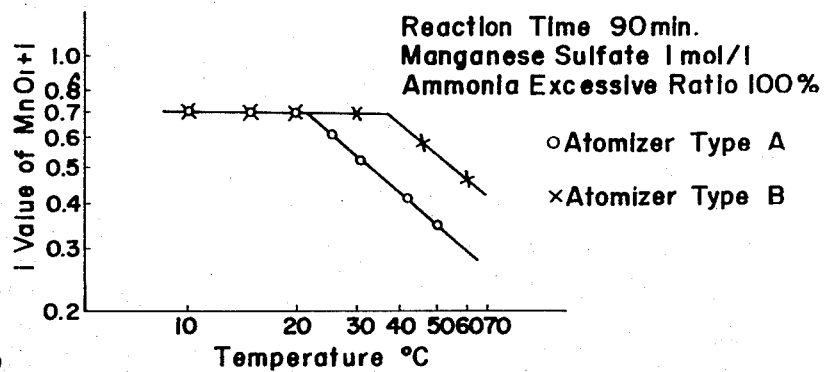
FIG. 2 is a graph on which the relationship between the $i$ values, as hereinafter defined, of $MnO_{1+i}$ and the regeneration temperatures is plotted.
Figure 3:
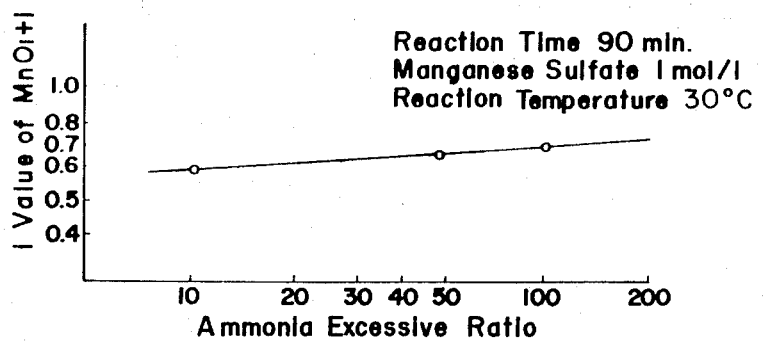
FIG. 3 is a graph on which the relationship between the $i$ values of the manganese oxide and the excess amount of ammonia for converting the manganese sulfate to manganese oxide and ammonium sulfate is plotted.

Extensive experiments have demonstrated that in respect to the reaction conditions even readily available inexpensive oxygen sources such as air may be used as oxidizing agents. It has been ascertained that the activated hydrated manganese oxide can be readily and successfully obtained by selecting suitable reaction conditions as shown in FIGS. 2 and 3. According to the results as plotted in these figures, by adding an excess of ammonia over the theoretical amount, superior results are obtained. Further, by maintaining the reaction temperature below 45° C., preferably in a range of 10 to 40° C., and by carrying out the oxidation with oxygen or an oxygen-containing gas such as air in the form of fine bubbles of 0.2 to 5.0 millimeter diameter, superior results in respect to the formation of the hydrated manganese oxide are obtained. The fine bubbles for the oxygen or the oxygen-containing gas may be obtained by passing the gas through a porous plate or other suitable gas dispersing means.

In the above formula, the oxygen content in the manganese oxide has been indicated by the subscript $1+i$ while the water content of the hydrated manganese oxide has been indicated as $XH_2O$. In accordance with this invention, $i$ in these formulas should be about between 0.5 to 0.8 so that the total amount of oxygen in the formula MnO will be 1.5 to 1.8 while the X in $XH_2O$ should be about between 0.3 to 1.0. If the reaction conditions mentioned hereinabove are adhered to, these preferred $i$ and X values can be obtained within 1 to 2 hours of regeneration. It has been ascertained that hydrated manganese oxide of the indicated formula has extraordinarily advantageous absorbing capacity in respect to $SO_2$ and $SO_3$.

It has also been ascertained that the concentration of the ammonium sulfate in the reaction system does not significantly affect the composition of the activated hydrated manganese oxide finally obtained. This means that an active hydrated manganese oxide of the indicated composition can be obtained even if the solution of manganese sulfate contains about 20 percent of ammonium sulfate. As previously set forth, ammonium sulfate produced in the process may be recycled to the leaching bath as indicated by reference numeral 7 in FIG. 1 to facilitate the leaching of the solid manganese sulfate. Therefore, whether the manganese sulfate solution is oxidized in the presence or in the absence of ammonium sulfate is of no significance in respect to the final composition of the manganese oxide. However, addition of ammonium sulfate solution to the leaching step is preferred—in economical aspect as follows: It will be appreciated that the ammonium sulfate can be obtained in the inventive process in commercial quantities by raising the concentration of the ammonium sulfate in the solution which is ultimately stored in the tank 50. Since the ammonium sulfate is recirculated, its concentration will gradually build up until it is sufficiently high to warrant commercial exploitation.

The activated hydrated manganese oxide of this invention includes what is referred to as "unknown A-type" and "unknown Y-type" in admixture with one-another, produced by adding an aqueous solution of manganese sulfate to an aqueous solution containing ammonia in excess (preferably) of chemical equivalent at which reaction with the manganese sulfate occurs and by rapidly oxidizing due to the blowing of pressurized air or oxygen at normal pressures through perforated plates, as indicated by the following relation: $Mn_3O_4$ is converted to "hydrohausmannite" which is converted to gamma-$Mn_2O_3 \cdot H_2O$ which is converted to gamma-MnOOH which is converted to "unknown Y" a part of which is converted to "unknown A," the latter two comprising the activated hydrated manganese oxide absorbant of the process of this invention. The above beginning, intermediate, and final products as examined by an electron microscope are characterized as illustrated in Table 1, and the n-value also given—as a ratio of oxygen atoms to manganese atoms in the actual molecule thereof:

TABLE 1

| Compound | n-value | Observed microscopic particle shape |
|---|---|---|
| $Mn_3O_4$ | 1.30–1.43 | Fine particles. |
| Hydrohausmannite | 1.38–1.45 | Do. |
| Gamma-$Mn_2O_3 \cdot H_2O$ | 1.47–1.48 | Needle-shaped. |
| Alpha-MnOOH | 1.51–1.58 | Agglomerated. |
| "Unknown Y" | 1.51–1.63 | String or plate. |
| "Unknown A" | 1.66–1.79 | Foil. |

Further explanations:

(a) Regarding $Mn_3O_4$, its intensity of X-ray diffraction is very low, as compared with that of $Mn_3O_4$-hausmannite prepared by baking a compound of manganese at a temperature of 1000 degrees centigrade. Further, its diffraction angle and its strength ratio with respect to peak diffraction are equal to those shown in ASTM cards. Further, a small quantity of crystal water is contained.

(b) Hydrohausmannite has the same diffraction angle and the same strength ratio as those shown in ASTM cards. The same applies in the case of gamma-$Mn_2O_3 \cdot H_2O$.

(c) The product alpha-MnOOH is the same as MnOOH, a final product obtained in slow oxidation using air at normal (usual atmospheric) pressures. This is in contrast to the pressurized rapid oxidation of the invention.

(d) It is known that manganese oxides found between $MnO_{1.6}$ and $MnO_2$ are Mn (II)—manganite and $MnO_{1.88}$. But, both the unknown Y and the unknown A are different from these in respect of X-ray diffraction pattern. Further, both of them have other patterns from those of manganese oxide shown in ASTM cards. Accordingly, the activated hydrated manganese oxide is utterly new.

In the X-ray diffraction patterns of the unknown Y and the unknown, A, only a peak diffraction is found. In view of this fact, we cannot determine their crystal structures. You will note that we called manganese oxides having such peculiar patterns the unknown Y and A which are merely arbitrary names assigned.

It can be said that the activated manganese oxide has a complicated structure consisting of bivalent, trivalent and tetravalent manganese atoms accompanied by oxygen atoms, hydroxyl groups, and water molecules. The activated hydrated oxide is a so-called non-stoichiometric compound in which holes due to escape of magnanese atoms exist, and is not a mixture of compounds such as $MnO_2O_3$, and/or $MnO_2$. Accordingly, the above-noted characterizing formula of the activated hydrated manganese oxide of this invention has been arrived at.

With regard to the absorption capacity of the inventive use of the activated hydrated manganese oxide of this invention in removing sulfur dioxide from a contaminated gas, Tables 2 and 3 both illustrate the new use as well as make possible a comparison of the high absorption capacity with the inferior absorption capacities of prior manganese oxides employed as absorbant.

TABLE 2

| Absorbent | Rate of $SO_2$ removal (percent) | Remarks |
|---|---|---|
| Activate hydrated manganese oxide (of the invention). | 85 | Produced according to the present invention. |
| Gamma-$MnO_2$ | 9.5 | Electrolytic manganese oxide. |
| Gamma-$Mn_2O_3 \cdot H_2O$ | 15 | Monohydrated $Mn_2O_3$. |
| Manganese ores | 2-8 | Ores: (1) pyrolusite; (2) rhodochrosite. |
| $MnO_{1.88}$ | 63 | Prepared according to the example in U.S. Pat. No. 3,150,923. |
| Gamma-$Mn_2O_3$ | 24 | Do. |

The Table 2 determinations were made under test conditions and with apparatus as follows:

Apparatus: The apparatus employed for suspending the absorbent and obtaining the absorption of $SO_2$ gas was as follows. An absorbent feeder fed angularly downwardly into an upwardly-extending riser conduit a fine feed of absorbent particles; in counter-flow upward direction through the riser conduit a flow of the sulfur oxide-containing gas fluidizes the absorbant and directs it through a continuing downward conduit. After a predetermined fluidized contact time, the conduit terminates at a cyclone for removing the suspended absorbent while a gas-lead-off tube extending from a central upward space about within the cyclone, and having the tube entrance directed toward about the base of the cyclone, leads-off the absorbent-free gas away from the cyclone absorbent-collector.

Test conditions were as follows:

Riser: 25 mm. in diameter x 3,000 mm. H
Downward pipe: 100 mm. in diameter x 3,000 mm. H
Gas: Heavy oil combustion waste gas
Quantity of flow: 100 N l./min.
Temperature (inlet): 150° C.
$SO_2$ concentration (inlet): 2,000 p.p.m.
Quantity of absorbent (Mn/$SO_2$ molar ratio): 8 mol/mol
Solid-gas contact period: 11 sec.

TABLE 3

| Absorbent | Rate of reaction (percent) | Bulk specific gravity (g./cc.) | Specific area of surface (m.²/g.) | Remarks |
|---|---|---|---|---|
| $\beta$-$MnO_2$ | 3.2 | 2.88 | | |
| $\gamma$-$MnO_2$ | 12.8 | 2.16 | | |
| $\alpha$-$Mn_2O_3$ | 1.2 | 2.88 | | |
| $Mn_3O_4$ | 2.2 | 1.13 | | |
| $MnO_{1.88}$ | 59 | 0.29 | | U.S. Pat. 3,150,923; |
| $Mn_3O_4$ | 24 | 1.2 | 36 | Intermediate products (refer to paragraph 1). |
| Hydrohausmannite | 31 | 0.58 | 83 | |
| $\gamma$-$Mn_2O_3 \cdot H_2O$ | 39 | 0.44 | 86 | |
| $\alpha$-MnOOH | 46 | 0.50 | 89 | |
| Unknown Y | 53 | 0.40 | 110 | |
| Unknown A | 60 | 0.46 | 210 | |

Test conditions are as follows.

Inlet gas composition:
$SO_2$: 4400 p.p.m.
$O_2$: 5 vol. percent
$H_2O$: 12 vol. percent
$N_2$: rest
Gas quantity of flow: 230 m./min.
Temperature in pipe: 120° C.
Absorbing period: 3 hrs.
Quantity of sample: 1 g.

Apparatus: A fixed-bed absorption apparatus employed for the tests resulting in the Table 3 data is as follows: Surrounded by an electric furnace, a fixed-bed container channels a feed gas into a base-space of the container upwardly through a container-enclosed and container-supported bed, upwardly first through a glass-wool layer, next upwardly through a quartz-sand bed layer, upwardly through a layer of mixed absorbent and quartz-sand, upwardly through a second quartz-sand layer, and finally upwardly through a top-layer of glass wool; the cleansed gas is then channeled through an outlet to a suitable gas collector. A thermocouple of the furnace extends into the upper space above the top layer of glass wool.

The invention, with reference to the accompanying FIG. 1, will now be described by several examples, it being understood, however, that these examples are given by way of illustration and not by way of limitation and that many changes may be carried out without affecting in any way the scope and spirit of the invention as recited in the appended claims.

EXAMPLE I

Waste gas flow was subjected to the inventive gas purification treatment in a plant corresponding to that represented in FIG. 1 under the following conditions and with the following results:

Apparatus

The apparatus of FIG. 1 contains two continuous 2-step bubble type oxidizing columns 23, designated columns A and B (A and B not separately illustrated). In a first column (A), air is fed at the bottom to form fine bubbles by means of bubble dispersing plates. Thereby, oxidation is promoted. A mixture liquid of reaction products and solution is initially fed into an upper space of the column (A) and the remaining portion which reaches the bottom of the column (A) without being subjected to reaction is fed in series to a second column (B) into about the top, and out of about the bottom thereof (B) the manganese oxide and ammonium sulfate are channeled off. Into the bottom of the second column (B)—as with the first column (A)—pressurized air is fed, for completing the oxidation, bubbling upwardly through the column. The oxidizing columns are each equipped with cooling jackets; 380 mm. in diameter x 4.100 mm. H–2 sets, for the two columns.

Test conditions

Concentration of manganese sulfate solution: 1.4 mol/l.; flow rate: 110 l./hr.; concentration of ammonia: 5.6 mol/l.; reaction temperature: 20° C.; average retention time: 2 hrs. (through two columns); gas dispersing plate: A-type (course bubble generating type); oxygen gas: 90–95% in purity; flow rate: 450–500 Nl./hr. The term "average retention time" means average time for which the mixture stays in the columns (A and B). The symbol "mol/l." means "moles per liter."

Qualities of obtained manganese oxide:
  Composition: $MnO_{1.72} 0.8H_2O$
  Bulk density. 0.337 g./cm.$^3$
  Surface area: 135 m.$^2$/g.

Ammonium sulfate solution obtained as by-product:
  Concentration: 35 wt. percent
  No Mn and other impurities were detected.

(1) Absorption test:

Apparatus: Fixed bed type, grain size 8–24 mesh; space velocity: 1000 l./hr.
Gas: Heavy oil combustion gas ($SO_2$:0.3, $O_2$:2.5, $CO_2$:12.5, $H_2O$:8.5, and balance $N_2$ by volume percent) at 130° C.
Result: $SO_2$ absorption ability: 28 g.—$SO_2$/100 g. absorbent.

(2) Results of absorption test:

Apparatus: Fluidized bed type
Gas: Heavy oil combustion boiler flue gas: 3000 Nm.$^3$/hr.; gas temperature at inlet of apparatus 125° C.; $SO_2$:0.1 vol. percent;
Absorbent: Having the above quality 308 kg./hr.; solid gas contact time 8 sec.
Test result: $SO_2$ removing ratio 100%.

EXAMPLE II

The same equipment as described in connection with Example I was employed except that a B-type gas dispersing plate for generating fine bubbles was used.

The results were as follows:

Test conditions:
  Concentration of manganese sulfate: 1.4 mol/l.;
  Flow rate: 110 l./hr. Reaction temperature: 30° C.;
  Average retention time: 2 hrs. (through two columns);
  Gas dispersing plate: B-type (fine bubble generating type);
  Oxygen gas 90–95% in purity. Flow rate: 450–500 l./hr.
  Quality of produced manganese oxide:
    Composition: $MnO_{1.68}H_2O$; Bulk density: 0.625 g./cm.$^3$
    Surface area: 125 m.$^2$/g.

Ammonium sulfate solution obtained as by-product:
  Concentration: 35% by weight.
  No Mn and other impurities were detected.

Absorption test results:

Apparatus: Fluidized bed type; pulverized absorbent was fed into the top side of a horizontal tube carrying $SO_2$-contaminated gas under pressure being passed through the tube which thereafter includes a vertical extending tube followed for upward flow followed by a second vertical tube for downward flow, after which the tube leads to a dust collector from which pulverized absorbent is channeled downwardly and from which clean gas is channeled upwardly from a central space within the collector.
  Gas: Heavy oil combustion boiler flue gas: 3000 Nm.$^3$/hr.; gas temp, at inlet of apparatus: 125° C. $SO_2$:0.1 vol. percent
  Absorbent: Having the quality as above: 310 kg./hr. Solid-gas contact time 8 sec.
  Test result $SO_2$ removing ratio: 95%

(3) The purity of the ammonium sulfate obtained by the process of this invention is very high, since the oxidation is carried out in an alkaline state and therefore impurities, such as manganese, iron and other heavy metals, are transferred into the solid phase as hydroxides of a very small solubility. Experimental results indicated that no impurities were present. The amount of manganese in the solution decreases as a function of time as follows:

| Reaction time (min.): | $Mn^{++}$ (mol/l.) |
|---|---|
| 0 | 1.4 |
| 10 | 0.9 |
| 20 | 0.7 |
| 30 | 0.2 |
| 40 | 0.02 |
| 50 | --- |
| 60 | --- |

EXAMPLE III (A) Absorption apparatus: Fluidized bed type solid-gas contact apparatus consisting of an upward current tube (25 mm. in diameter x 3000 mm. H) and a downward current tube (100 mm. in diameter x 3000 mm. H).

(B) Test conditions:

Heavy oil combustion waste gas: 100 N l./min., 150° C. at inlet,
$SO_2$ concentration: 0.2 vol. percent at inlet,
Absorbent: quantity in mol ratio of Mn/$SO_2$ . . . 8 mol/mol, grading . . . 150 micron or less,
Solid-gas contact time: 11 sec.

What is claimed is:

1. In a process of removing sulfur oxide from a sulfur oxide-containing gas, comprising contacting the sulfur oxide-containing gas with a manganese-oxide absorbent, the improvement being said absorbent consisting essentially of substantially solid activated dry manganese oxide characterized by the formula: $MnO_{1+i} \cdot XH_2O$ wherein $i$ ranges from about 0.5 to about 0.8 and $x$ ranges from about 0.1 to about 1.0, and by 4.6 or 7.18 angstroms distance between atomic planes at maximum defraction strength of line, said manganese oxide further characterized in that, when regenerated, the manganese oxide absorbent has
   (a) bulk density of from about 0.337 g./cm.$^3$ to about 0.625 g./cm.$^3$, and
   (b) surface area of from about 125 m.$^2$/g. of about 135 m.$^2$/g.

2. The improvement according to claim 1, in which said absorbent consists of a rapidly-oxidized oxygen-ammonium hydroxide-activated manganese oxide derived from aqueous manganese sulfate solution by reaction at a predetermined cool temperature with ammonium hydroxide and oxygen.

3. The improvement according to claim 2, in which said absorbent is derived from a rapid oxidation comprising bubbling pressurized oxygen-containing gas bubbles through a mixture of said ammonium hydroxide present in at least about a stoichiometric amount and said aqueous manganese sulfate solution, said bubbles ranging substantially each respectively from about 0.2 to about 5.0 millimeters in diameter, in which said predetermined temperature ranges from about 10 to about 45 degrees centigrade, and in which said contacting comprises dispersing said particles in a flow of said sulfur oxide-containing gas.

4. The improvement according to claim 3, in which said oxygen-containing gas bubbles consist of oxygen.

5. The improvement according to claim 1, in which said process consists of said contacting being sufficient to produce manganese sulfate, and including forming an aqueous solution of said manganese sulfate, adding to said solution an ammonia, that being added in at least stoichiometric amount for reaction with manganese sulfate of said solution, said adding forming a mixture, and bubbling a pressurized oxygen-containing gas through said mixture sufficiently for a reaction to form regenerated substantially solid activated manganese oxide characterized by particles of at least one string shape, plate shape, and foil shape, and by said formula, and maintaining a temperature ranging from about 10 to about 40 degrees during said reaction.

6. The improvement according to claim 5, in which said ammonia is employed in excess of said stoichiometric amount during said reaction, and in which said regenerated activated manganese oxide is dispersed in said flow.

7. The improvement according to claim 6, in which ammonium sulfate formed during said reaction is recycled and added to said manganese sulfate solution.

8. The improvement according to claim 5, including separating said regenerated manganese oxide from an aqueous solution of ammonium sulfate formed during said reaction, after said separating heat-concentrating resulting effluent solution and concurrently collecting residual ammonia being heat-liberated from said effluent solution during said heat-concentrating.

9. The improvement according to claim 8, including recycling said ammonia to said aqueous manganese sulfate solution.

10. The improvement according to claim 9, in which at least a portion of said concentrated ammonium sulfate solution is withdrawn and recovered.

11. A process of removing sulfur oxides from sulfur-oxide containing waste gas flow, which comprises
(a) introducing the sulfur-oxide gas at a temperature greater than 100° C. at normal pressure into a dry reaction zone,
(b) contacting and treating the gas in the dry reaction zone concurrently in a moving bed with solid particulate manganese oxide dry absorbent of the formula $MnO_{1+i} \cdot XH_2O$, wherein $i$ stands for a number between 0.5 to 0.8 and X stands for a number between 0.3 and 1.0, said manganese/oxide further characterized in that when regenerated, the manganese oxide absorbent has
  (i) bulk density of from about 0.337 g./cm.$^3$ to about 0.625 g./cm.$^3$, and
  (ii) surface area of from about 125 m.$^2$/g. to about 135 m.$^2$/g.,
(c) withdrawing the treated gas effluent stream and dry absorbent concurrently,
(d) separating the spent dry absorbent from the treated gas stream,
(e) removing the spent absorbent from the treated waste flow and moving the spent absorbent to a regeneration zone in which the spent absorbent is dissolved in a solvent selected from water and aqueous ammonium sulfate,
(f) admixing the solution thus obtained with ammonia,
(g) oxidizing the solution thus obtained with an oxidizing agent selected from gaseous oxygen and an oxygen-containing gas, at a temperature of from about 10° C. to about 45° C., in the form of fine bubbles of gas comprising oxygen of from about 0.2 to about 1.0 millimeter diameter whereby hydrated manganese oxide of the above formula and an aqueous ammonium sulfate solution are formed and regenerated,
(h) separating the aqueous ammonium sulfate solution, and
(i) recovering the manganese oxide in substantially the same dry absorbent state as the initial manganese oxide charged to the aforesaid moving bed wherein the sulfur oxide waste gas flow is treated.

12. A process as claimed in claim 11, wherein (i) the separated and recovered manganese oxide is recycled to the dry reaction zone for use in dispersion in and treatment of a fresh amount of waste gas flow containing sulfur oxide, (ii) a portion of the separated aqueous ammonium sulfate solution is recycled to dissolve solid manganese sulfate and regenerate dry, solid absorbent manganese oxide at the formula defined in claim 13, the amount of ammonium sulfate which is recycled to dissolve the manganese sulfate being so chosen that a manganese sulfate solution containing more than 5 percent by weight of ammonium sulfate is formed, and the amount of ammonia which is added to said manganese sulfate solution being in excess of the amount necessary to convert said manganese sulfate into ammonium sulfate and manganese hydroxide.

13. A process as claimed in claim 11, wherein (i) said ammonium sulfate solution obtained after separation of said manganese oxide is concentrated by heating, while liberating residual ammonia from the solution, (ii) the liberated ammonia is recycled to the manganese sulfate solution, and (iii) a portion of the concentrated ammonium sulfate solution obtained is withdrawn and recovered.

14. A process as claimed in claim 11, wherein the solid manganese oxide absorbent consists of essentially manganese oxide of the formula $MnO_{1+i} \cdot XH_2O$ where $i$ stands for about 0.7 and X stands for a number from about 0.8 to about 1.0, said manganese oxide further characterized in that when regenerated, the manganese oxide absorbent has
(a) bulk density of from about 0.337 g./cm.$^3$ to about 0.625/cm.$^3$, and
(b) surface area of from about 125 m.$^2$/g. to about 135 m.$^2$/g.

References Cited

UNITED STATES PATENTS

| | | | |
|---|---|---|---|
| 3,150,923 | 9/1964 | Bienstock et al. | 23—2 SQ |
| 1,951,341 | 3/1934 | Bradley | 23—145 |
| 2,608,466 | 8/1952 | Fox | 23—145 |
| 3,320,157 | 5/1967 | Arey et al. | 23—145 |
| 2,459,714 | 1/1949 | Moulton | 23—145 |

OTHER REFERENCES

Uno et al.: "A New Dry Process of $SO_2$ Removal from Flue Gas," 7th World Petroleum Congress, vol. 9, pp. 289–295, 1967.

EARL C. THOMAS, Primary Examiner

U.S. Cl. X.R.

423—548, 605